Patented Apr. 22, 1952

2,593,787

UNITED STATES PATENT OFFICE 2,593,787

STABILIZATION OF POLYMERIZABLE UN-
SATURATED DICARBOXYLIC ACID POLY-
ESTERS AND MIXTURES THEREOF WITH
VINYLIC MONOMERS

Earl E. Parker, Milwaukee, Wis., assignor to Pittsburgh Plate Glass Company, Allegheny County, Pa., a corporation of Pennsylvania No Drawing. Application March 30, 1951,
Serial No. 218,534

26 Claims. (Cl. 260—45.4)

The present invention relates to stabilization of polymerizable unsaturated alkyd resins, especially materials which are polymerizable by addition reaction of double bonds in a structure of the partial formula

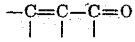

involving carbon-oxygen conjugation and it has particular relation to such materials when they include a compound involving a chain like polyester structure such as is obtained by condensing an α β ethylenic α β dicarboxylic acid with a dihydric alcohol.

One object of the invention is to provide a polymerizable material of the foregoing type which is stabilized against premature gelation during relatively prolonged periods of storage.

A second object is to provide a material which is stable during extended periods of storage but which can readily be cured to a resinous state under appropriate conditions.

A third object is to provide a stabilized composition of the foregoing type which is highly resistant to gelation in the absence of peroxide catalysts of polymerization but which resinifies quickly at relatively low temperatures when a catalyst is added.

A fourth object is to provide a copolymerizable mixture of an ethylenically unsaturated monomer and a polyester of a dihydric alcohol and a dicarboxylic acid at least a part of which is α β ethylenic, α β dicarboxylic, which mixture is stable against gelation under conditions of storage and readily curable to a resinous state under appropriate conditions.

A fifth object is to provide a copolymerizable mixture of the foregoing type which cures rapidly and smoothly without excessive rise of temperature.

A sixth object is to provide such copolymerizable mixtures which will cure readily to provide relatively large castings which are sound and of good color.

These and other objects will be apparent from consideration of the following specification and the appended claims.

It has heretofore been recognized that linear polyesters of dihydric alcohols and dicarboxylic acids, at least a portion of which were α β ethylenically unsaturated, dicarboxylic acids in which the carboxylic groups are linked to one or both of the ethylenic carbon atoms, were capable of polymerization by addition reaction between the ethylenic groups of a plurality of molecules to form thermoset products. This type of material is widely disclosed, for example in U. S. Letters Patent Nos. 2,409,633 and 2,443,735 to 2,443,741 inclusive granted to Kropa or U. S. Letters Patent 2,450,552 granted to Hurdis.

It has also been suggested to admix liquid, or at least fusible linear polyesters such as are disclosed in the foregoing patents, with ethylenically unsaturated monomers and copolymerize the two by heating the mixture in the presence of a peroxide catalyst. This reaction has been extensively elaborated upon in patents and publications. Typical examples of publications are to be found in Industrial and Engineering Chemistry, December 1939, page 1512 and January 1940, page 64.

The foregoing polymerizable compositions undergo addition reaction, that is reaction at the points of carbon-carbon unsaturation, even in the absence of polymerization catalysts and at room temperature or thereabouts. This is especially true in the case of copolymerizable mixtures of the polyesters and the ethylenically, or vinylically unsaturated monomers. A polyester of maleic or fumaric acid and a glycol such as propylene glycol or diethylene glycol, in the presence of a vinylic monomer such as styrene, unless inhibited, will begin to gel almost at once. This is true even in the absence of polymerization catalysts and at room temperature. A catalyst may be desirable to obtain complete cure of such mixture in a reasonable time, but nonetheless, polymerization will quickly proceed so far in the uncatalyzed mixtures as to prevent or at least interfere with normal casting or laminating operations.

This strong tendency of the copolymerizable mixtures to set prematurely was early recognized (see Ellis Patent 2,255,313). In the patent, it is proposed to improve this property by incorporation a cellulose as a filler. This, of course, greatly restricts the field of application of the mixtures.

It has further been proposed to improve the storage characteristics of the copolymerizable mixtures by adding small amounts of stabilizers such as phenolic compounds, e. g. hydroquinone.

U. S. Patent 2,409,633 contains such suggestion. However, for many applications, the phenolic compounds were poor inhibitors of gelation. They often continued to inhibit the polymerization even when the catalyst was added and the mixture was heated. Therefore, they unduly slowed up the reaction and necessitated unduly high curing temperatures. This was objectionable in making castings. The inhibitors also tended to discolor the resins, a feature highly objectionable in the casting art. Castings of substantial size also tended strongly to crack or break in the curing operations.

The present invention is designed to provide a resinifiable composition that comprises an unsaturated alkyd polyester, a component of which is an α β ethylenically unsaturated dicarboxylic acid (or a mixture of such polyester and a vinylic monomer), which is highly stable in storage, but which will cure readily without substantial discoloration or cracking.

The invention is based upon the discovery that salts of quaternary ammonium hydroxides are outstandingly successful as gelation inhibitors during storage of the foregoing polyesters or mixtures of such polyesters.

THE POLYMERIZABLE MIXTURES

The polymerizable mixtures to be stabilized under the provisions of the present invention are now conventional in the art. The foregoing patents and articles in Industrial and Engineering Chemistry are illustrative of the fact. These prior art references are herewith incorporated as a part of this disclosure. The mixtures should contain but little or no water.

THE ETHYLENICALLY UNSATURATED DICARBOXYLIC ACID

It is apparent that an appropriate α β ethylenic dibasic acid for use in the preparation of an ethylenically unsaturated polyester may comprise a large class. Some of them in which the carboxyl groups thereof are linked to one or both of the carbon atoms of the ethylenic group designated as component A are tabulated as follows:

Table A
1. Maleic acid
2. Fumaric acid
3. Aconitic acid
4. Mesaconic acid
5. Citraconic acid
6. Ethyl maleic acid
7. Pyrocinchoninic acid
8. Xeronic acid
9. Itaconic acid Carbic acid (endomethylene Δ 4 tetrahydrophthalic acid of my prior application Serial No. 598,639, filed June 9, 1945, now abandoned, of which this application is a continuation-in-part), although not strictly α β ethylenic is also contemplated. The chlorine substituted derivatives of the acids, e. g., chloromaleic acid, are also contemplated.

The anhydrides of these acids, where the anhydrides exist, are, of course, embraced under the term "acid," since the reaction products or polyesters are the same. Often it is preferable to operate with the anhydride rather than the free acid.

THE DIHYDRIC ALCOHOLS

The dihydric alcohols termed component (B) of the polyester embrace such compounds as are included in the following table:

Table B
1. Ethylene glycol
2. Diethylene glycol
3. Triethylene glycol
4. Polyethylene glycol
5. 1,3 dipropanediol
6. 1,2 propylene glycol
7. Dipropideneglycol or di-1,3 propanediol
8. Butylene glycol Halogen substituted glycols, e. g., mono-chlor derivatives are contemplated.

THE SATURATED DICARBOXYLIC ACIDS

It is to be understood that the invention contemplates the presence of a non-ethylenic dicarboxylic acid component along with the ethylenically unsaturated dicarboxylic acid in the polyester composition. Indeed, in most instances the mixed polyesters are preferred.

Examples of appropriate saturated dicarboxylic acids are tabulated as follows:

Table C
1. Phthalic acid
2. Tetrachlorophthalic acid
3. Succinic acid
4. Adipic acid
5. Suberic acid
6. Azelaic acid
7. Sebacic acid
8. Dimethyl succinic acid
9. Chlorinated derivatives of the above acids For purposes of the present invention, the aromatic nuclei of such acids as phthalic are regarded as saturated since the double bonds do not react by addition as do ethylenic groups. The term "acid" also contemplates the anhydrides of the acids. Mixtures of any two of the acids 1 to 9 are contemplated.

Naturally some of the members of Tables A, B and C are preferable to others. For example, some of them may presently be unduly expensive, but since this condition is often subject to change, they are properly to be included.

DRYING OIL ACID COMPONENT

It may also be desirable to include a small amount of a drying oil acid in the polyester. Such acids impart air drying characteristics to the polyester, or the mixture of the polyester and the vinylic monomer. Appropriate drying oil acids termed acid D include those of the following table:

Table D
1. Linolenic acid
2. Linoleic acid
3. Elaeostearic acid
4. Octadecatrienoic acid
5. Clupanodonic acid Mixtures of these acids are contemplated.

PREPARATION OF THE POLYESTER

In the preparation of the polyesters, the dihydric alcohols of Table B which preferably contain no more than 10 carbon atoms are usually employed in approximate molar equivalency or slightly in excess of such equivalency of the sum of the acids of Tables A, C and D. Usually, this excess will not much exceed 10 or 20% and it may be lower. The excess glycol facilitates reduction of the acid number of the polyester.

The α β ethylenically unsaturated dicarboxylic acid may constitute the whole of the acid component of the polyester, but usually it is preferred to include at least some of one or more of the non-ethylenic acids from Table C. The amount of acid or acids from the latter table is capable of variation over a broad range. The minimum is, of course, none at all, and the maximum may be 10 or 12 mols per mole of the acid from Table A. Naturally, as the percentage of the acid from Table C is reduced, the polyester assumes more and more closely the character of the polyester containing only acid or acids from Table A. It is impossible to state an absolute minimum to the effective amount of acid from Table C. Amounts at least as low as 1/5 mol per mol of the first mentioned acids are suggested.

A component from Table D is also optional, dependent upon whether an air drying polyester is desired. A range of one mole of acid D to 2 to 12 mols of acids A or A and C is suggested.

Appropriate ranges of the several components of the polyester may be tabulated as follows:

Component (A).—α β ethylenic α β dicarboxylic acid—2 to 12 mols
Component (C).—Non-ethylenically unsaturated dicarboxylic optional, but if present—2/5 to 144 mols
Component (D).—Drying oil acid, optional but if present—1 mol per 2 to 12 mols A+C
Component (B).—Dihydric alcohol—Equivalent to or in slight excess of A+C+D Conditions of Reaction in Preparing Polyester In conducting the esterification of the dihydric alcohol and the acid or acids, conventional principles are adhered to. Acid catalysts may be added. The reaction may be conducted under an atmosphere of carbon dioxide or nitrogen gas. Xylene or other non-reactive solvent may be included and the reaction may be conducted by heating the mixture to reaction temperature, e. g., to that at which water is expelled from the system. It is continued until water ceases to evolve and the acid value of a sample is reasonably low, e. g., 5 to 50. It should not be continued so long as to result in infusibility of the polyester. Usually a temperature of 150 to 190 or 200° C. and a reaction time of 2 to 20 hours is sufficient to effect the esterification.

If desired, monohydric alcohol and/or monobasic may be added to the reaction product of dibasic acid and dihydric alcohol after such reaction is substantially complete. Thereafter the mixture may be heated to cause further reaction and unreacted components finally distilled off. Usually, the unsaturated polyester is very viscous or even solid, but is soluble in the vinylically unsaturated monomer, at least where warmed.

Stabilizing the Polyester Composition

It is usually desirable to add the salt of a quaternary ammonium to the polyester in the absence of monomer regardless of whether it is the polyester to be stabilized or the mixture thereof with a vinylic monomer. To this end, the quaternary ammonium salt is conveniently added to the polyester while it is warm. It will then dissolve immediately and will arrest any tendency of the batch to gel as it cools down. An appropriate temperature at which to make the addition of the salt is about 150° C. though, of course, it could be lower. It could also be higher so long as the salt is not decomposed.

The Quaternary Ammonium Salt

The quaternary ammonium salts have been extensively developed as a chemical class. There are many such compounds available. However, all herein contemplated will comprise the following basic structure:

where $R_1$, $R_2$, $R_3$, and $R_4$ are organic radicals and X is an acid radical. The salts may be considered as the reaction products of a quaternary ammonium hydroxide of the formula:

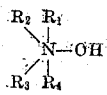

and an acid of the formula H—X where X is the negative radical of the acid.

In the formulae the organic groups $R_1$, $R_2$, $R_3$, $R_4$ may be of a single kind or they may be mixed. All of them may be hydrocarbon such as alkyl, alkenyl or alkynyl, e. g. ethyl, methyl, propyl, isopropyl, n-butyl, secondary butyl, tertiary butyl, vinyl, methallyl, or they may be oleyl or stearyl. All or a part may be aryl, e. g. phenyl, benzyl. It is further to be recognized that in some instances, a group such as $R_4$ may be an organic acid residue, such as one of the formula

where R is hydrocarbon of 1 to 18 carbon atoms and may be alkyl, aralkyl or aryl, e. g., lauryl, oleyl, phenyl, benzyl or the like.

Some of the possibilities for the several groups $R_1$, $R_2$, $R_3$, $R_4$ are tabulated as follows:

Table E

| | $R_1$ | $R_2$ | $R_3$ | $R_4$ |
|---|---|---|---|---|
| 1. | Methyl | Methyl | Methyl | Methyl. |
| 2. | Ethyl | Ethyl | Ethyl | Ethyl. |
| 3. | Propyl | Propyl | Propyl | Propyl. |
| 4. | Isopropyl | Isopropyl | Isopropyl | Isopropyl. |
| 5. | n-butyl | n-butyl | n-butyl | n-butyl. |
| 6. | Sec. butyl | Sec. butyl | Sec. butyl | Sec. butyl. |
| 7. | Tert. butyl | Tert. butyl | Tert. butyl | Tert. butyl. |
| 8. | Amyl | Amyl | Amyl | Amyl. |
| 9. | Octyl | Octyl | Octyl | Octyl. |
| 10. | Phenyl | Phenyl | Phenyl | Phenyl. |
| 11. | Tolyl | Tolyl | Tolyl | Tolyl. |
| 12. | Benzyl | Benzyl | Benzyl | Benzyl. |
| 13. | Cetyl | Cetyl | Cetyl | Cetyl. |
| 14. | Octadecyl | Octadecyl | Octadecyl | Octadecyl. |
| 15. | Alkyl or aryl | Alkyl or aryl | Alkyl or aryl | Lauroyl. |
| 16. | Alkyl or aryl | Alkyl or aryl | Alkyl or aryl | Palmitoyl. |
| 17. | Alkyl or aryl | Alkyl or aryl | Alkyl or aryl | Benzyl. |

It is to be understood that the various possible combinations of the groups 1 through 16 in the several positions $R_1$, $R_2$, $R_3$, $R_4$ are contemplated. That is, the compounds may be homogeneous or so mixed as to include any combination of the above groups desired.

In some instances, it will be apparent that two of the groups R are joined or interconnected in a ring structure. This is represented by the pyridinium salts. Salts of the formula:

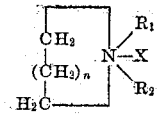

where $n$ is a whole number, e. g., 2 or 3 and $R_1$, $R_2$ and X are as above defined, and also belong in this class.

It is further to be appreciated that a plurality of quaternary ammonium groups may share a common hydrocarbon radical. Such compounds is represented by ethylene bis(pyridinium chloride) and ethylene bis(trimethyl ammonium bromide).

Ethylene, propylene, butylene and higher alkylene or ethylenically unsaturated hydrocarbon groups are also contemplated in one or more of positions $R_2$, $R_1$, $R_3$, $R_4$.

The presence of non-functioning substituents such as one or more chlorine or bromine atoms in the hydrocarbon radicals is not precluded.

In the acid component of the salt, whose negative radical is represented by the group X, the latter group should be at least as strongly negative as acetic acid and should not involve heavy radicals or groups that would reduce its negative character or unduly impair its mobility in the mixture. The use of excessively heavy organic acids to form the salts may also unduly increase the amount of salt required to attain stability. Organic acids employed preferably are of a weight not much above 200. Salts of weak acids, of course, are of basic character, owing to the strong basicity of the quaternary ammonium hydroxide from which the salts are derived. Bases, usually, promote gelation rather than inhibiting it. The salts of the strong non-oxidizing mineral acids usually are the most satisfactory. The acid organic substitution products such as the acid sulfates, sulfonates and phosphonates of these acids are also contemplated. The following are some of the acids that may be employed to supply the radical X:

*Table F*

1. Acetic
2. Succinic
3. Sulfuric
4. Phosphoric
5. Hydrochloric
6. Hydrobromic
7. Chloroacetic
8. Malonic
9. Hydriodic
10. Oxalic
    Hydroxy acids such as:
11. Malic acid
12. Tartaric acid
13. Lactic acid It is desirable that the quaternary ammonium salt be soluble in, or compatible with, the polyester or mixtures of polyester and monomer at least in amount to attain desired stability.

The invention contemplates the use of the various quaternary ammonium compounds which are presently enjoying use as germicides and surface tension reducing agents.

Quaternary ammonium salts of more strongly oxidizing acids, such as nitric acid, chromic acid and the like, are less desirable inasmuch as they may strongly influence the gelling characteristics of the mixture by their oxidizing effects. Sulfuric acid or phosphoric acid are not of this type. Hence salts of acids which have an oxidizing power no greater than that of phosphoric or sulfuric are within the contemplation of this invention.

The following constitute specific examples of quaternary ammonium salts which are contemplated as stabilizers or gelation inhibitors for polymerizable polyesters or mixtures of such polyesters and ethylenically unsaturated monomers:

*Table G*

1. Trimethyl benzyl ammonium acetate
2. Trimethyl benzyl ammonium chloride
3. Trimethyl benzyl ammonium bromide
4. Triethyl benzyl ammonium chloride
5. Tripropyl benzyl ammonium chloride
6. Tributyl benzyl ammonium chloride
7. Cetyl trimethyl ammonium chloride
8. Octadecyl trimethyl ammonium chloride
9. Trimethyl benzyl ammonium sulfate
10. Lauroyl pyridinium chloride
11. Phenyl trimethyl ammonium chloride
12. Tolyl trimethyl ammonium chloride
13. Benzyl trimethyl ammonium phosphate
14. Benzyl trimethyl ammonium iodide
15. Ethyl pyridinium chloride
16. Phenyl trimethyl ammonium chloride
17. Octyl trimethyl ammonium bromide
18. Ethylene bis (pyridinium chloride)
19. Ethylene bis (trimethyl ammonium bromide)
20. Trimethyl benzyl ammonium oxalate
21. Trimethyl benzyl ammonium malate
22. Trimethyl benzyl ammonium tartrate
23. Trimethyl benzyl ammonium lactate One important group of quaternary salts comprises those with a benzyl group and three alkyl groups, (methyl, ethyl, propyl, butyl, amyl or the like) directly attached to ammonium nitrogen. These compounds may be represented by the formula:

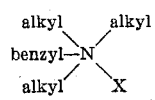

X being an acid radical of an acid as strong as acetic acid (dissocation constant $1.75 \times 10^{-5}$ or stronger.

Another important class comprises quaternary ammonium salts where one hydrocarbon group is higher alkyl and contains at least 8 and up to 18 carbon atoms; three hydrocarbon groups are lower alkyl containing up to 6 carbon atoms (methyl, ethyl, propyl, butyl, hexyl). The structure of such compound may be represented by the formula:

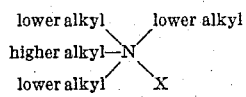

X again being an acid or negative group of an acid at least as strong as acetic acid.

Salts of quaternary ammonium hydroxide can be dissolved in polyesters of $\alpha\beta$ ethylenic $\alpha\beta$ dicarboxylic acids and dihydric alcohols (or their derivatives as modified by dicarboxylic acids and/or drying oil acids) to provide products that can be stored for very long periods without fear of gelation. The stabilizers are preferably added to the polyester while the latter is hot.

A curing catalyst, e. g., benzoyl peroxide, tertiary butyl hydroperoxide, cyclohexyl hydroperoxide, acetyl peroxide, lauroyl peroxide, or the like can be added to the stabilized mixture in appropriate amount (.01 to 5% by weight) at any time. The mixture when heated will cure rapidly and completely with but little interference from the inhibitor.

COPOLYMERIZABLE MIXTURES OF POLYESTERS AND VINYLIC MONOMERS

The copolymerizable mixtures of the polyesters and vinylic monomers are, of course, much more reactive than the polyesters per se, and the stabilization of these mixtures is usually more urgent than that of the polyester. Such copolymerizable mixture may comprise any of the polyesters which have already been described and these may be incorporated with a suitable vinylically unsaturated monomer such as those referred to in the foregoing patents.

THE VINYLIC MONOMERS

The monomers comprise any of the common vinylic compounds capable of cross linking unsaturated polyester molecules at their points of unsaturation. Usually they contain the reactive group $H_2C=C<$. The ethylenically unsaturated polyesters and the vinylically unsaturated compounds are mutually soluble. The monomeric compound is also normally a liquid, polymerizable compound. Some of the monomers are tabulated as follows:

*Table H*

1. Styrene
2. α methyl styrene
3. p-methyl styrene
4. Divinyl benzene
5. Indene
   Unsaturated esters such as:
6.     Vinyl acetate
7.     Methyl methacrylate
8.     Methyl acrylate
9.     Allyl acetate
10.     Diallyl phthalate
11.     Diallyl succinate
12.     Diallyl adipate
13.     Diallyl sebacate
14.     Diethylene glycol bis (allyl carbonate)
15.     Triallyl phosphate
16.     Vinyl chloride Any one of these vinylic monomers may be combined with any of the polyesters prepared from components A and B, A, B and C, A, B and D or A, B, C and D as previously described.

Mixtures of any two or more of the foregoing vinylic compounds and the polyesters are contemplated.

The vinylic monomer usually will comprise from 10 to 60% upon a weight basis of the copolymerizable mixture and mixtures containing 20 to 40 or 50% by weight of monomer are to be preferred.

To formulate stabilized or non-gelling mixtures of (I) an unsaturated polyester of a dihydric alcohol and an acid comprising an α β dicarboxylic α β ethylenically unsaturated acid and (II) a vinylic monomer, it is preferred to dissolve a quaternary ammonium salt (for example one of those listed in Table G) as an inhibitor in the polyester component. This is best accomplished by adding the salt to the polyester while the latter is hot, e. g., about 150° C. or to such other temperature as will effect rapid and complete solution. This can be determined by observation, as it is easy to see when all of the quaternary salt has disappeared into the polyester. The quaternary ammonium salt may be added in an amount of about .01 to 2% by weight of the ultimate mixture of components I and II. This is essentially the same procedure as is employed to stabilize the polyester without monomer.

The monomer such as one of those from Table H is added in appropriate amount at 120° C. or lower temperatures (e. g., 10 to 60% by weight of the monomer-stabilized polyester mixture).

Since the unsaturated polyesters are usually quite viscous or even solid at room temperature, they should be sufficiently warm to mix with and dissolve in the monomeric or vinylically unsaturated compound. The quaternary ammonium salts as herein disclosed, stabilize the copolymerizable mixtures while the ethylenically unsaturated or vinylically unsaturated compound is incorporated therein. When the mixture is cooled down to room temperature, it will remain stable for a considerable period. To cure the mixture, catalyst is added and the mixture is raised to curing temperature. The salts do not substantially interfere with the desired cure. The mixtures usually are free of water or nearly so.

The resultant mixtures are stable in storage for long periods of time, in some cases for a period of at least three years, which is often better stability even than is required.

However, when the mixtures are to be cured, they can easily be incorporated with a peroxide catalyst such as benzoyl peroxide or tertiary butyl hydroperoxide or others in conventional amounts, e. g., .1 to 5%, and cured. The temperature of cure can be moderate, e. g., below 100° C., but may be much lower, e. g., room temperature (22° C.,) or thereabouts. The resins may be further hardened by baking them at 125 to 150° C. or thereabouts. Higher temperatures of initial curing and baking are permissible. However, they should not be so high as to volatilize the monomer (in initial cure) or to char or discolor the final product. The time of curing and baking, of course, will vary greatly depending upon such factors as the size and thickness of the body to be formed and the temperature of reaction. Usually 5 minutes to 2 hours are sufficient. However, it is easy to determine by hardness tests when the articles are cured to hard, clear state.

It is an important feature of the use of the quaternary ammonium salts as inhibitors of gelation that although they are very effective in periods of storage of the uncatalyzed mixture, the catalyzed mixtures cure very readily and completely at low temperatures. Where the mixture is employed to embed delicate objects such as insects, biological specimens or the like, cure can be effected without damaging them. Also, in making castings in molds of latex or the like, the low curing temperature is desirable to avoid damage to the molds.

It is also a feature of the use of the quaternary ammonium salts that they do not discolor the product in which they are employed. Furthermore, castings formed from copolymerizable mixtures are sound and free of cracks. Products in which conventional inhibitors are employed during storage often are cracked or broken. This is especially true in the case of realtively massive castings.

It is to be understood that while the quaternary ammonium salts, taken by themselves, are excellent gelation inhibitors for copolymerizable mixtures of unsaturated polyesters and vinylic monomers, other inhibitors, such as those of conventional type, such as hydroquinone, can also be included along with the salts. These may be employed, for example, in a proportion of approximately 1% by weight based upon the weight of the quaternary salt or such other proportion as is expedient. Such additional inhibitors sometimes are helpful where the time and temperature of the cure is relatively unimportant and where it is desirable to increase the so-called "tank life" of the mixture, that is to increase the period in which catalyzed mixtures can be stored without gelation.

It is understood that such vinylic monomers as styrene, as sold commercially, normally contain small amounts of inhibitors to admit of storage and shipment thereof without gelation or polymerization. Commercial monomers containing such inhibitors, e. g., quinone or hydroquinone, in small amounts can be employed in the present process. Obviously, the inhibitor in the monomer is greatly diluted when the latter is incorporated with a polyester under the provisions of the present invention. Also, in many instances, the effectiveness of the added inhibitor carried in the monomer has been greatly reduced by the period of storage which the monomer has undergone before it is admixed with the polyester. Normally the inhibiting effect of the stabilizer in the monomer will not be objectionably great. However, if so desired, the inhibitor of commercial styrene or other monomer can be eliminated by distillation before the monomer is incorporated with a polyester containing a quaternary ammonium salt as an inhibitor.

Applications of the principles of the invention are illustrated by the following examples:

EXAMPLE I

Trimethyl benzyl ammonium chloride, in a proportion of .003 part by weight was incorporated into 2 parts by weight of propylene maleate phthalate which was a polyester of approximately 1 mol of maleic acid and 1 mol of phthalic acid with 2 mols, or a slight excess thereof of propylene glycol. The addition of the salt was effected by adding it to the polyester while the latter was at a temperature of about 150° C.

This mixture was quite stable over long periods of time. When it is desired to effect a cure of the mixture, a catalyst, e. g., benzoyl peroxide, or any of the others herein enumerated, e. g., .1 to 5%. The mixture can be readily polymerized by heating it in the usual manner. Products resulting from such mixture are hard, clear and sound.

To the stabilized mixture a monomer such as styrene or any of those from Table H can be added to provide a stabilized copolymerizable mixture. The mixture cures rapidly when a catalyst such as tertiary butyl hydroperoxide is added. The amount of monomer may be within a range of 10 to 50% by weight of the total mixture.

EXAMPLE II

To a mixture of 2 parts by weight of propylene maleate phthalate and a quaternary ammonium salt, e. g., .003 part trimethyl benzyl, as above described in Table G, was added 1 part by weight of diethylene glycol bis(allyl carbonate). This mixture was stable for more than 18 days at 150° F. (an accelerated aging test) and for 6 months at 70° F.

EXAMPLE III

In this example, 2 parts by weight of propylene maleate phthalate were stabilized with trimethyl benzyl ammonium chloride as described in connection with Example I. This mixture constituted a stabilized unsaturated polyester which could be stored for long periods of time without objectionable polymerization. To this mixture could be added 1 part by weight of methyl methacrylate as a monomer. Such mixture is stable for more than 40 days at 150° F. and more than 180 days at 70° F. Corresponding mixtures of propylene maleate phthalate and methyl methacrylate in the absence of the gelation inhibitor gelled in less than 1 day at 150° F. and within 30 days at 70° F.

EXAMPLE IV

In this example, 2 parts by weight of propylene maleate phthalate containing 0.003 part by weight of trimethyl benzyl ammonium chloride were incorporated with 1 part by weight of vinyl acetate. The mixture did not gel in 40 days at 150° F. or within 180 days at 70° F. The unstabilized mixtures gelled in 1 day at 150° F. and within 30 days at 70° F.

EXAMPLE V

In this example, 2 parts by weight of diethylene fumarate were stabilized with .003 part by weight of trimethyl benzyl ammonium bromide in the manner already described. This mixture was stable and could be preserved for long periods of time without gelation. It could be cured in conventional manner. Two parts by weight of this mixture were added to 1 part by weight of diethylene glycol bis (allyl carbonate). The mixture was stable for more than 50 days at 150° F. and for more than 180 days at 70° F. A like mixture free of quaternary ammonium salt gelled in 1 day at 150° F. and in 30 days at 70° F.

EXAMPLE VI

In this example, 1 part by weight of a polyester which was propylene maleate was stabilized with 0.002 part by weight of triethyl benzyl ammonium chloride. The polyester could be preserved satisfactorily and would cure in the conventional manner in the presence of suitable peroxide catalysts. To the polyester mixture was added an equal amount by weight of diethylene glycol bis (allyl carbonate). This mixture was stable for more than 50 days at 150° F. and for more than 180 days at 70° F. A like mixture free of added inhibitor gelled in a single day at 150° F. and in 30 days at 70° F.

EXAMPLE VII

In this example, 2 parts by weight of propylene azelate maleate could be stabilized with .001 to .01, e. g., .003 part by weight triethyl benzyl ammonium chloride to provide a stabilized polyester. The stable polyester was then further incorporated with 1 part by weight of diethylene glycol bis (allyl carbonate) to provide a copolymerizable mixture. This mixture was stable for more than 20 days at 150° F. and 180 days at 70° F. The corresponding mixture without the inhibitor gelled in 1 day at 150° F. and in 30 days at 70° F.

EXAMPLE VIII

To 1 part by weight of propylene maleate phthalate was added .001 to .01 part of phenyl trimethyl ammonium chloride thereby providing a stabilized propylene maleate phthalate polyester. This mixture was suitable for use as a polymerizing type of alkyd resin. When a peroxide catalyst was added, it would cure by addition reaction. To the mixture was added an equal amount by weight of diethylene glycol bis (allyl carbonate). The mixture successfully withstood an accelerated gelling test at 150° F. for 20 days. It was stable at a storage temperature of 77° F. for 120 days.

EXAMPLE IX

To 2 parts by weight of diethylene fumarate adipate was added .0015 to .015 part lauroyl pyridinium chloride to provide a stabilized polyester mixture and to the mixture was then added 1 part by weight of diethylene glycol bis (allyl carbonate) to form a mixture that was stable for 20 days at 150° F. and for 120 days at 77° F.

EXAMPLE X

To a mixture of .003 part by weight of any one of the quaternary ammonium salts from Table G, e. g., trimethyl benzyl ammonium bromide in 2 parts by weight of diethylene fumarate was added 1 part by weight of diallyl phthalate. Such mixture was stable for more than 50 days at 150° F. and 180 days at 70° F.

EXAMPLE XI

To a mixture of 1 part propylene maleate add .002 part by weight of any one of the quaternary ammonium salts from Table G, e. g., triethyl benzyl ammonium chloride, and to the resultant mixture add 1 part by weight diallyl phthalate. The resultant mixture will withstand an accelerated gelling test at 150° F. for 50 days and will withstand storage at 70° F. for 180 days.

EXAMPLE XII

In this example, 2 parts by weight of diethylene fumarate phthalate may be stabilized by means of .015 part trimethyl benzyl ammonium acetate and to the stabilized polyester may be added 1 part by weight of diallyl phthalate to provide a copolymerizable mixture stable for 10 days at 150° F. or 120 days at 70° F. When it is desired to cure the mixture, a peroxide type catalyst may be added in appropriate amount, e. g., .1 to 5%, and the mixture cured in conventional manner.

EXAMPLE XIII

In this example, propylene azelate maleate in a proportion of 2 parts by weight may be employed. Octadecyltrimethyl ammonium chloride in an amount of .001 to .1, e. g., 0.01 part, parts by weight may be incorporated as a stabilizer. One part by weight of diallyl phthalate may be added as a vinylic monomer. This mixture is stable for 40 days at 150° F. and will withstand storage for 180 days at 77° F.

EXAMPLE XIV

Propylene adipate fumarate in a proportion of 2 parts by weight was stabilized with .001 to .01, e. g., 0.003, part by weight octyltrimethyl ammonium bromide and 1 part by weight diallyl phthalate was added as a monomer. The resultant mixture was stable for 30 days at 150° F. and 180 days at 70° F.

EXAMPLE XV

Propylene maleate phthalate in a proportion of 1 part by weight was stabilized with .001 to .01, e. g., 0.003, part by weight of benzyl trimethyl ammonium sulfate and to the stabilized polyester was added 1 part by weight of diallyl phthalate to form a copolymerizable mixture which would withstand an accelerated gelling test of 150° F. for 15 days and storage at 70° F. for 150 days.

EXAMPLE XVI

Add to 2 parts by weight of diethylene fumarate 0.003 part by weight of any one of the other quaternary ammonium salts from Table G, e. g., trimethyl benzyl ammonium bromide. Then add 1 part by weight of vinyl acetate to the mixture. This copolymerizable mixture will withstand the accelerated gelling test at 150° F. for 50 days and will withstand storage at 70° F. for 180 days. The mixture can readily be incorporated with catalyst of the peroxide type and successfully cured to a hard durable resin in the usual manner.

EXAMPLE XVII

Diethylene maleate phthalate in a proportion of 2 parts by weight was stabilized with 0.003 part by weight of triethyl benzyl ammonium chloride and to the stabilized polyester was added 1 part by weight of vinyl acetate to form a mixture that will withstand the accelerated gelling test at 150° F. for 50 days and which can be stored at 70 F. for 180 days.

EXAMPLE XVIII

In this test, a stabilized mixture of 2 parts by weight propylene azelate maleate, 1 part vinyl acetate and .001 to 0.1, e. g., 0.02, part by weight of trimethyl benzyl ammonium acetate was prepared. The mixture withstood the accelerated gelation test at 150° F. for 10 days and withstood storage without gelation for 120 days at 70° F. The corresponding mixture without stabilizer gelled in 1 day at 150° F. and in 25 days at 70° F.

EXAMPLE XIX

Propylene adipate fumarate in a proportion of 2 parts by weight was stabilized with triethyl benzyl ammonium chloride in a proportion of .001 to .01, e. g., .006, part by weight and then was admixed with 1 part by weight of vinyl acetate to provide a mixture stable for 30 days or more at 150° F. and which could withstand storage for more than 180 days at 70° F. The corresponding mixture in the absence of stabilizer gelled at 150° F. within a day and within 27 days at 70° F.

EXAMPLE XX

A mixture of 2 parts by weight of diethylene maleate phthalate and 1 part by weight of methyl methacrylate stabilized with 0.003 part by weight triethyl benzyl ammonium chloride was stable for 11 days at 150 F. and for over 90 days at 70° F.

EXAMPLE XXI

Propylene adipate fumarate in a proportion of 1 part by weight and methyl methacrylate in a proportion of 1 part by weight was stabilized with .001 to 0.1 part by weight of trimethyl benzyl ammonium bromide. This mixture could be stored under atmospheric conditions and when incorporated with benzoyl peroxide or tertiary butyl hydroperoxide or other catalyst of polymerization could be cured to a satisfactory resin.

EXAMPLE XXII

In this example, a similar mixture was prepared from 2 parts by weight of diethylene maleate phthalate, 1 part by weight of methyl methacrylate and .001 to 0.1 part trimethyl ammonium phosphate.

EXAMPLE XXIII

In this example, 2 parts by weight of propylene maleate phthalate (equal mols of maleic acid and phthalic acid) were stabilized with trimethyl benzyl ammonium paratoluene sulfonate. To this mixture was added 1 part by weight of styrene. With a total mixture containing .1% by weight of the salt, a stability of 4 days at 150° F. was obtained.

EXAMPLE XXIV 35 parts propylene maleate phthalate
18 parts styrene
0.1 to .5% inhibitor
.001% quinone In the polyester, maleic acid and phthalic acid were equimolar. The inhibitors and the storage tests are tabulated below:

| Inhibitor | Per Cent Used | Storage Life 150° F. | Storage Life 77° F. |
|---|---|---|---|
| Cetyl trimethyl ammonium bromide. | 0.5 | 21 days | |
| Octadecyltrimethyl ammonium chloride. | 0.5 | 30 days | |
| Benzyltrimethyl ammonium chloride. | 0.1 | 20–40 days | 1 yr. |
| Benzyltrimethyl ammonium bromide. | 0.1 | 8 days | 6 months. |
| Benzyltrimethyl ammonium sulfate. | 0.1 | 3 days | 3 months. |
| Benzyltrimethyl ammonium acetate. | 0.1 | 3 days | 45 days. |
| Lauroyl pyridinium chloride | 0.1 | 33 days | |
| Phenyl trimethyl ammonium chloride. | 0.1 | 20 days | |
| Benzyl trimethyl ammonium chloride. | 0.1 | 20 days | |
| Ethylene bis (pyrodinium chloride). | 0.1 | 14 days | |
| Ethylene bis (trimethyl ammonium bromide). | 0.1 | 10 days | |
| Control | | 1 hour | 1 day. |

In Examples I through IV, VII, VIII and IX, XII, XIII, XIV, XV and XVII through XXIII, the ethylenically unsaturated and the saturated dicarboxylic acids are in approximately equal molar ratios. This ratio can be varied in the manner heretofore described.

A trace of quinone, e. g., about 1% based on the tertiary amine or quaternary ammonium salt content of the mixture can be added, further to stabilize the mixtures in the preceding examples but in most cases stability is adequate without it.

From the foregoing examples it will be apparent that polymerizable dihydric alcohol esters of alpha-beta unsaturated, alpha-beta dicarboxylic acids, or copolymerizable mixtures thereof with monomeric olefinic compounds capable of effecting cross-linkage of the polyester nuclei can readily be stabilized with salts of quaternary ammonium compounds to provide mixtures that can be stored without gelling for long periods of time.

It is to be appreciated that in order to effect a rapid cure of the mixtures of polyester and the olefinically unsaturated monomer, a catalyst of the addition reaction involved in copolymerization is usually desirable. However, in some instances, e. g., where high curing temperatures or long curing times are permissible, or ultraviolet irradiation is available, catalysts may be omitted.

Appropriate catalysts include peroxides such as:

Benzoyl peroxide
Tertiary butyl hydroperoxide
Cyclohexyl hydroperoxide
Acetyl peroxide
Lauroyl peroxide These are merely typical, others are available. The catalysts will usually be employed within a range of .01 to 5%, e. g., 1% of the mixture. Preferably the catalyst is added shortly before the mixture is to be polymerized.

Other types of catalysts such as thioglycollic acid or catalysts such as are employed as accelerators of rubber vulcanization or as rubber preservatives, obtained by condensation of amines and aldehydes, e. g., formaldehyde or acetaldehyde or butyraldehyde and aniline or toluidine may be employed. Many of these are described in The Chemistry of Synthetic Resins, vol. I, pages 704–711, Carleton Ellis, copyrighted 1935, Reinhold Publishing Corporation. Mixtures of the two types of catalyst, e. g., 1% of benzoyl peroxide or tertiary butyl hydroperoxide, with butyraldehyde-aniline may be employed.

In order to promote the polymerization of a mixture such as is disclosed in Examples I to XXV inclusive, a catalyst, e. g., benzoyl peroxide, or any of the others mentioned, in an amount of .1 to 5% by weight is added and the mixture is heated up to an appropriate temperature, for example, to about 93° C. Lower temperatures, say 75° C., may also be employed. By heating the mixtures at this latter temperature for a period of about an hour, it can be polymerized to the setting stage. Subsequently, it can be rendered harder and more durable by baking at a temperature of about 125 to 150° C. Of course, higher temperatures of baking can be employed provided they are not so high as to char or discolor the product. The products normally will be clear and strong. The polymerizable mixtures may be cast and cured in suitable molds with or without pressure.

Fillers such as cellulose fibers, asbestos and glass fibers can be added to the stabilized polymerizable mixtures in amounts, for example, up to 300% or more based upon the polymerizable liquids. Fabrics of glass fibers can also be impregnated or coated with the polymerizable mixtures. Mixtures of fibrous material and resin constituents can be heated under pressure to form hard, strong bodies of appropriate form.

Plasticizers such as dimethyl phthalate can also be added to the polymerizable mixtures in amounts, for example, of 5 to 40% based upon polymerizable constituents.

The polymerizable mixtures can be applied as coatings to metal, wood, paper, cotton or other cloth and cured in situ to form protective films.

EXAMPLE XXV

This example is for purposes of comparing quaternary ammonium salts as inhibitors of gelation in polyesters of alpha-beta ethylenic alpha-beta dicarboxylic acids and glycols or mixtures of such polyesters and monomers with other common types of inhibitors. In the tests, a polyester which was the condensation product of 2.2 mols of 1,2 propylene glycol, 1 mol of maleic anhydride and 1 mol of phthalic anhydride was prepared, and was then divided into 4 equal samples of 200 grams each. To sample I was added .1 part by weight of trimethyl benzyl ammonium chloride.

Samples II was stabilized with .1% by weight of parabenzyl amino phenol.

Sample III was stabilized with .1% by weight of di-beta naphthyl paraphenyl di-amine.

Sample IV was stabilized with .0168% by weight of hydroquinone.

To each of the four samples was added 100 grams of styrene.

To the foregoing samples was added .5% by weight of tertiary butyl hydroperoxide which is the catalyst most commonly used in casting mixtures of the foregoing type. The samples were then placed in pint jars of common Mason type so that the depth of the copolymerizable mixture in all jars was about equal and greater than 1 inch. The jars were then placed in a water bath at 100° F. for 1 hour.

At the end of this period, sample I containing trimethyl benzyl ammonium chloride as a stabilizer had gelled, indicating that the stabilizer had but little retarding effect upon the rate of cure of the catalyzed mixture at moderate temperatures. This stabilizer would be very desirable in mixtures employed in forming castings where low temperatures of cure were required.

None of the other samples had gelled. This was an indication that the inhibitors in these samples had materially retarded the rate of cure of the mixture at 100° F.

The water bath was then gradually warmed over a period of 1 hour to a temperature of 190° F. at which value it was held for a further period of 15 minutes. At the conclusion of this period, it was found that all samples had resinified and the products were of the following characteristics:

Sample I which was stabilized with trimethyl benzyl ammonium chloride was a hard, sound casting which was clear, colorless and free of cracks.

Sample II which had been stabilized with .1% by weight of parabenzyl amino phenol resulted in a product which was brown in color and severely fractured.

Sample III which was from the mixture stabilized with di-beta naphthyl paraphenyl diamine was black in color and was severely fractured.

Sample IV which had been stabilized with hydroquinone formed a resin which was of a yellow color and was severely fractured. This test demonstrated the fact that the quaternary ammonium compound was of outstanding merit in the protection of mixtures employed as casting resins, especially those to be cast at low or moderate temperatures and in the absence of substantial pressures because the stabilized mixtures could be cured so readily to provide such satisfactory products.

EXAMPLE XXVI

In this example, a series of tests were conducted to determine the stabilizing effect of a number of different quaternary ammonium salts in the absence of catalysts at an elevated temperature and further to test the curing rate of these samples after the catalyst had been added. For purposes of comparison, similar tests were conducted upon samples stabilized with certain conventional inhibitors of gelation. In the example, a polyester which was prepared from 2.2 moles of 1,2 propylene glycol, 1 mole of maleic anhydride and 1 mole phthalic anhydride was employed. To 2 parts by weight of this polyester was added 1 part by weight of styrene. This mixture was divided into the requisite number of samples for the several tests.

The accelerated aging test hereinafter designated as "Test A" was conducted by incorporating the gelation inhibitor to the uncatalyzed copolymerizable mixture and subjecting the stabilized mixture to a temperature of 150° F. until gelation occurred.

The low temperature test, "Test B" was conducted at slightly above normal room temperature with benzoyl peroxide as a catalyst. The latter was added to the stabilized mixtures and the mixtures were stored at 77° F.

Further to determine the retarding effect of the inhibitors upon the copolymerizable mixtures after the addition of catalyst, tertiary butyl hydroperoxide was added to samples stabilized with .1% by weight of the several inhibitors in a proportion of .1% by weight and the stabilized mixture was then stored at 77° F. until gelation occurred. This test is hereinafter designated as "C."

A similar test was conducted upon certain of the stabilized mixtures including the various gelation inhibitors with .5% of tertiary butyl hydroperoxide as a catalyst. This test is hereinafter designated as "D."

Finally, to determine the retarding effect of the gelation inhibitors upon the catalyzed mixtures at normal curing temperatures, a series of samples was prepared containing 1.5% by weight of benzoyl peroxide as catalyst and, of course, containing gelation inhibitors. Test tubes 16 millimeters in diameter containing the mixture to a depth of 3 inches were placed in a water bath at a temperature of 180° F. The temperatures of the mixtures during the curing operation were determined by means of conventional thermocouples and the time in minutes required for the temperatures of the samples to rise from 150° F. to the maximum, which was termed the peak exotherm, was observed and is hereinafter recorded in the test designated as "E." This test constitutes a good indication of the rate at which the catalyzed mixtures will cure when heated.

The results of these several tests are recorded as follows:

| No. | The Inhibitor Compound | Test A— No catalyst 150° F. Time in days | Test B— Benzoyl peroxide. Time in hours 77° F. | Test C— .1% t-butyl hydroperoxide, 77° F. Time in hours | Test D— .5% t-butyl hydroperoxide, 77° F. Time in hours | Test E— Benzoyl peroxide bath, 180° F. Time in minutes |
|---|---|---|---|---|---|---|
| 1 | .1% Lauroyl pyridinium chloride | 8 | 11–15 | 4½ | 2 | 3.2 |
| 2 | .1% Cetyltrimethyl ammonium bromide. | 8 | 4–8 | 4 | 2 | 3.1 |
| 3 | .1% Phenyltrimethyl ammonium chloride. | 8 | 17 | 4 | 2 | 2.9 |
| 4 | .1% Trimethyl benzyl ammonium chloride. | 8 | 11–15 | 4 | 1.5 | 3.5 |
| 5 | .1% Trimethyl benzyl ammonium chloride + quinone (0.0012). | 9 | | 7 | 2 | |
| 6 | .5% Trimethyl benzyl ammonium hydroxide. | 1.5 | | | | |
| 7 | .1% Hydroquinone | 8 | 192 | 216 | 192 | 29.3 |
| 8 | .1% 4-tertiary butyl catechol | 8 | 192 | 216 | 72 | 26.7 |
| 9 | .1% Catechol | 8 | 192 | 216 | 72 | 7.0 |
| 10 | .1% Ascorbic acid | gelled at once | | gelled at once | gelled at once | |
| 11 | .1% Alpha naphthol | .5 | | 60 | 34 | |
| 12 | .1% Tertiary butyl catechol + n-butyl amine. | 9 | | 216 | 72 | |
| 13 | .1% Di-β-naphthyl p-phenylene diamine. | 9 | 43–120 | 216 | 34 | 17.4 |

In the tests, the inhibitors 1 to 5 were quaternary ammonium salts of the type contemplated herein. The remaining compounds represented inhibitors, or presumed inhibitors selected from the prior art. Compounds 1 to 5 gave mixtures which were well stabilized for storage, and would withstand an accelerated gelation test at 150° F. for 8 or 9 days. They would gel quickly, even at low temperatures, when the catalysts were added. When the catalysts of polymerization were added and the mixtures were heated to the normal curing range, the cure proceeded very rapidly and the peak of the exotherm was attained in 3 or 4 minutes.

In contradistinction with compounds 6 to 13, some did not substantially retard gelation of the mixtures even before the catalyst was added. Some, such as the phenolic compounds, did stabilize the uncatalyzed mixtures, but they also greatly interfered with subsequent cure of the catalyzed mixtures. In most cases several days were required to attain gelation at normal room temperature and the catalyzed mixtures even when heated did not reach the peak of their exothermal rise even in many minutes.

EXAMPLE XXVII

In this example, a resin-like polyester or alkyd body resulting from conventional esterification of 1.2 propylene glycol in a ratio 2.2 moles, maleic anhydride 1 mole, and 1 mole of phthalic anhydride was prepared. The polyester was cooked until it was solid or nearly solid but was still fusible. Any of the other unsaturated polyesters or alkyds herein disclosed could be employed in this example. To this mixture was added .01 to 2%, e. g., .1%, by weight of trialkyl benzyl ammonium oxalate, e. g., triethyl or preferably trimethyl benzyl oxalate. The mixture was warmed until the oxalate salt dissolved. Solution took place below 150° C.

A liquid soluble monomer, namely styrene, was added to the stabilized polyester in a proportion of 2 parts by weight of polyester per 1 part by weight of monomer. The temperature was selected to attain reasonable fluidity of the polyester, thus facilitating addition of the monomer. Usually such addition can be effected at about 120° C. However, if the polyester is inherently soft or fluid, this temperature may be reduced. If a harder polyester is employed, it may be desirable to increase the temperature.

The polyester and the quaternary ammonium oxalate readily dissolved in each other. Likewise, the polyester and the vinylic compound, namely styrene, could readily be admixed in the presence of the salt without danger of premature gelling.

The stabilized mixture could be stored for long periods at room temperature without gelling. The stabilized mixture withstood an accelerated gelation test in the absence of catalyst and at 150° F. for 4 days before gelation occurred.

An outstanding characteristic of mixtures stabilized with quaternary ammonium oxalate is unusual "tank life" (resistance to gelation after the catalyst is added) coupled with remarkable ease of curing at the normal curing temperature of the catalyzed mixture. This combination of characteristics is demonstrated by the following tests:

EXAMPLE XXVIII

To a set of samples of the copolymerizable mixture of the polyester and styrene of Example XXVII stabilized with .1% by weight of trimethyl benzyl ammonium oxalate was added 1.5% by weight of benzoyl peroxide. These samples withstood gelation at a temperature of 71° F. for a period of 54 to 58 hours.

Samples of the same mixture similarly stabilized and catalyzed when subjected to an "LPE" test in the manner already described to determine rate of cure, reached "peak exotherm" in 2.6 minutes. This is a very rapid rate of cure.

The samples, when gelled, can be baked at 100 or 150° C. for a period, e. g., 5 minutes to 2 hours, in order fully to harden them. The time required for gelling and curing, naturally, will vary, dependent upon the thickness or mass of the body formed, the hardness desired, the catalyst employed, etc.

EXAMPLE XXIX 400 grams of propylene maleate phthalate (prepared by heating together propylene glycol, phthalic anhydride and maleic anhydride in the proportion of 2.2 moles of glycol, one mole of phthalic anhydride and one mole of maleic anhydride, to an acid number of about 45) was mixed with 200 grams of styrene and the amounts of 0.1 percent by weight inhibitor set forth in the table below. These mixtures were tested for storage stability at 150° F. and for tank life at 77° F. in the presence of 1.5% benzoyl peroxide. The results were as follows:

| Inhibitor | Stability at 150° F. | Tank Life |
|---|---|---|
| Trimethyl (benzyl ammonium) acid oxalate. | 25 | Over 100 hours. |
| Di-(trimethyl benzyl ammonium) oxalate. | 28 | Do. |
| Mono (trimethyl benzyl ammonium) maleate. | 18 | Do. |
| Di (trimethyl benzyl ammonium) maleate. | 15 | Do. |
| Mono (trimethyl benzyl ammonium) tartarate. | 18 | Do. |
| Di (trimethyl benzyl ammonium) tartarate. | 17 | Do. |
| Trimethyl benzyl ammonium lactate. | 18 | Do. |
| Trimethyl benzyl ammonium glycolate. | 18 | Do. |

From the above disclosure and examples, it will be apparent that a wide variety of quaternary ammonium salts stabilize the contemplated polymerizable compositions without adversely affecting the rate of cure. Since the salts of weaker acids are less effective than salts of strong acids, it is found desirable to use salts of acids which are at least as strong as acetic acid.

As a general proposition, the soluble salts of non-oxidizing acids which have dissociation constants for the first acid hydrogen of at least $1 \times 10^{-3}$ are superior. Thus the halides have been found to be especially valuable.

As shown above, the oxalate salts have been found to be unusually effective in promoting long "tank life." That is, polymerizable compositions containing a quaternary ammonium oxalate and a peroxide catalyst are stable at room temperature for unusually long periods of time and in this respect at least are superior even to the halide. Unlike many of the phenolic compounds such as hydroquinone, the oxalic acid salts of quaternary ammonium bases do not interfere appreciably with the rate of cure of the catalyzed copolymerizable mixtures when the latter are heated to normal curing temperatures, e. g., 150° F. or thereabouts.

The quaternary ammonium oxalates such as trimethyl benzyl ammonium oxalate may be employed in polymerizable mixtures of any of the liquid or fusible ethylenically unsaturated polyesters and any of the soluble vinylically unsaturated polymerizable compounds herein disclosed. The oxalate salts can be substituted for all or a part, e. g., 10 to 90% of any of the other quaternary ammonium salts, e. g., trimethyl or triethyl benzyl chloride, etc., in Examples I through XXVI.

By thus admixing the quaternary ammonium oxalates with other quaternary ammonium salts such as the halides, e. g., trimethyl benzoyl chloride, in the resinifiable mixtures, mixtures of outstanding storage stability and exceptional "tank life" combined with an exceptionally good rate of cure may be obtained.

Good "tank life" is a desirable property in certain instances where it is desired to store the copolymerizable mixture for several hours or a day or two after the peroxide catalyst has been added.

Among the oxalate salts which may be used according to this invention are those salts in which the hydrocarbon groups are any of the groups listed in Table E.

In lieu of oxalate salts, salts of other carboxylic acids in forming the quaternary ammonium salts, particularly those having a dissociation constant of at least $1 \times 10^{-3}$ may be used. Examples of these are the hydroxy acids such as malic, tartaric or lactic or chloracetic acid, etc. These salts are prepared by reacting an appropriate quaternary ammonium hydroxide, e. g., trimethyl, triethyl, tripropyl or tributyl benzyl ammonium hydroxide, with an acid such as maleic, tartaric or lactic (or their anhydrides).

Naturally the resultant salt will be of the formula:

X is acid radical as herein disclosed and N is the number of carboxyls of the acid which are neutralized. Groups $R_1$, $R_2$, $R_3$, and $R_4$ may be various radicals including those listed in Table E.

Webs or sheets of fibrous materials such as asbestos, cotton fibers, glass fibers, or the like can be dipped or otherwise treated with catalyzed mixtures of unsaturated polyester and vinylic monomer stabilized with the oxalate salts of quaternary ammonium hydroxide. These webs can be stored in uncured state for a substantial period and still the webs can readily be cured when they are subjected to infra-red radiation or are passed over heated surfaces such as a hot drum.

Naturally, a salt of a quaternary ammonium base to be fully effective must be soluble at least to a reasonable degree in the mixture to be stabilized. Solubility of the salts will vary, some being more soluble than others. A salt which if sufficiently soluble, may be an excellent stabilizer, may fail to produce optimum results in a given polyester mixture simply because it does not dissolve to a sufficient degree. In some mixtures a given salt is often more soluble than in other mixtures. It is probable that the nature of both the polyester and of the liquid polymerizable compound affect the stability. Mixtures containing homogeneous esters of maleic or fumaric acid gel more rapidly than those of mixed polyesters containing large amounts of dicarboxylic acids free of unsaturation and therefore are more difficult to stabilize. The mixtures containing styrene as the vinylic compound gel more quickly than those containing alpha methyl styrene or a vinylic ester.

Accordingly, it will be apparent that a salt of a quaternary ammonium base that may not be of optimum value in some copolymerizable mixtures will perform substantially better in another and will be completely satisfactory.

This application is a continuation-in-part of application Serial No. 166,068, filed June 3, 1950, which is a continuation-in-part of my copending application Serial No. 807, filed January 6, 1948, which further is a continuation of my prior application Serial No. 630,551, filed November 23, 1945, now abandoned. It is further a continuation-in-part of my prior application Serial No. 598,639, filed June 9, 1945.

The several embodiments of the invention herein disclosed are representative. It will be apparent that numerous modifications may be made therein without departure from the spirit of the invention or the scope of the following claims.

I claim:

1. As a new composition of matter, a mixture of (A) a liquid, polymerizable, ethylenically unsaturated compound, (B) a polyester of a dihydric alcohol and an alpha-beta dicarboxylic, ethylenically unsaturated acid, said ethylenically unsaturated compound and said polyester being copolymerizable and (C) a small stabilizing amount of a dissolved added salt of a quaternary ammonium hydroxide and oxalic acid.

2. As a new composition of matter, a copolymerizable mixture of (A) a liquid, polymerizable, ethylenically unsaturated compound, (B) a polyester of a dihydric alcohol and a dicarboxylic, ethylenically unsaturated acid, and (C) a small stabilizing amount of a dissolved added salt of a quaternary ammonium hydroxide and a hydroxy substituted carboxylic acid which is at least as strong as acetic acid.

3. An unsaturated alkyd resin which is a fusible, soluble polyester of a dihydric alcohol and an ethylenically unsaturated dicarboxylic acid and being stabilized with a small stabilizing amount of a dissolved quaternary ammonium oxalate.

4. A fusible, soluble unsaturated alkyd resin which is a polyester of a dihydric alcohol and an ethylenically unsaturated dicarboxylic acid, said resin being stabilized with a small stabilizing amount of a dissolved quaternary ammonium salt of a carboxylic acid which has a dissociation constant not less than $1 \times 10^{-3}$.

5. A new composition of matter comprising a polyester of a dihydric alcohol and an alpha-beta ethylenic, alpha-beta dicarboxylic acid, said polyester being stabilized by an effective amount of a dissolved added quaternary ammonium salt of a non-oxidizing acid at least as strong as acetic acid.

6. As a new composition of matter a copolymerizable mixture of: (A) a polyester of a dihydric alcohol and an alpha-beta dicarboxylic, alpha-beta ethylenically unsaturated acid and (B) an ethylenically unsaturated compound copolymerizable with the polyester, said mixture being stabilized against gelation in the absence of peroxide catalysts by a small effective amount of a dissolved added salt of a quaternary ammonium hydroxide and a non-oxidizing acid at least as strong as acetic acid.

7. A new composition of matter comprising a polymerizable unsaturated polyester of an ethylenically unsaturated dicarboxylic acid and a dihydric alcohol, said polyester containing in solution a small stabilizing amount of a dissolved quaternary ammonium salt of a non-oxidizing acid at least as strong as acetic acid.

8. As a resinifiable material a polyester of a dihydric alcohol and an alpha-beta ethylenic, alpha-beta dicarboxylic acid, said polyester being stabilized against premature gelation by a dissolved quaternary ammonium halide.

9. As a new composition of matter, a mixture of a polyester of a dihydric alcohol and an alpha-beta dicarboxylic, alpha-beta ethylenically unsaturated acid and an ethylenic compound copolymerizable with said polyester, said mixture containing in solution a small stabilizing amount of a quaternary ammonium halide.

10. A composition as defined in claim 9 in which the halide is of trialkyl benzyl ammonium hydroxide.

11. A composition as defined in claim 9 in which the halide is of a quaternary ammonium hydroxide containing 4 hydrocarbon groups directly attached to ammonium nitrogen.

12. A composition as defined in claim 9 in which the quaternary ammonium halide is cetyl trimethyl ammonium chloride.

13. A composition as defined in claim 9 in which the quaternary ammonium halide contains four groups directly attached to the ammonium nitrogen, 3 of the groups being hydrocarbon of 1 to 6 carbon atoms, the fourth group being of a class consisting of benzyl, phenyl, alkyl of 8 to 18 carbon atoms and

where R is a hydrocarbon radical containing up to 18 carbon atoms.

14. As a new composition of matter a mixture comprising (A) a polyester of a dihydric alcohol and an alpha-beta ethylenic, alpha-beta dicarboxylic acid and (B) an ethylenically unsaturated compound copolymerizable with the polyester, and (C) a salt of a quaternary ammonium hydroxide and a non-oxidizing acid at least as strong as acetic acid which has a molecular weight not exceeding 200.

15. A new composition of matter comprising (A) a polyester of a dihydric alcohol and an alpha-beta ethylenic, alpha-beta dicarboxylic acid and (B) styrene, said mixture being stabilized against premature gelation by a small, effective amount of a dissolved added quaternary ammonium salt of a non-oxidizing acid at least as strong as acetic acid.

16. As a new composition of matter, a copolymerizable mixture of (A) a polyester of an alpha-beta dicarboxylic, alpha-beta ethylenic acid and a dihydric alcohol and (B) styrene, said mixture being stabilized against premature gelation in storage by a small, effective amount of a dissolved halide salt of a quaternary ammonium hydroxide containing 4 groups directly attached to the ammonium nitrogen, three groups being hydrocarbon of 1 to 6 carbon atoms, the fourth being of the class consisting of benzyl, phenyl, alkyl of 8 to 18 carbon atoms and

where R is a hydrocarbon radical containing up to 18 carbon atoms.

17. A stabilized composition as defined in claim 16 in which the polyester is an ester of an alpha-beta dicarboxylic, alpha-beta ethylenic acid and another dicarboxylic acid which is free of unsaturated groups capable of polymerizing by addition, the latter acid being present in an amount of .25 to 6 mols per mol of the former acid.

18. As a new composition of matter, a copolymerizable mixture of an alpha-beta ethylenically unsaturated, alpha-beta dicarboxylic acid polyester of a dihydric alcohol and an ethylenically unsaturated monomer capable of cross-linking the polyester molecules at the points of unsaturation therein, said mixture being stabilized against premature gelation during storage by a small stabilizing amount of trimethyl benzyl ammonium halide, the methyl groups in said salt being attached to the ammonium nitrogen, said mixture being stable against gelation for periods of over 90 days at 70° F.

19. As a new composition of matter, a copolymerizable mixture of an alpha-beta ethylenically unsaturated, alpha-beta dicarboxylic acid polyester of a dihydric alcohol and an ethylenically unsaturated monomer capable of cross-linking the polyester molecules at the points of unsaturation therein, said mixture being stabilized against premature gelation during storage by a small stabilizing amount of triethyl benzyl ammonium halide, the ethyl groups in said salt being attached to the ammonium nitrogen, said mixture being stable against gelation for periods of over 90 days at 70° F.

20. As a new composition of matter, a copolymerizable mixture of (A) a dihydric alcohol polyester of a mixture of an alpha-beta ethylenically unsaturated, alpha-beta dicarboxylic acid and a saturated dicarboxylic acid of a class consisting of phthalic acid, adipic acid and azelaic acid and (B) an ethylenically unsaturated monomer capable of cross-linking the polyester molecules at points of unsaturation therein, said mixture being stabilized against premature gelation during storage by a small stabilizing amount of a trialkyl benzyl ammonium halide.

21. The composition of claim 22 wherein the unsaturated dicarboxylic acid is endomethylene $\Delta_4$ tetrahydrophthalic acid.

22. A composition of matter comprising a copolymerizable mixture of (A) a polymerizable unsaturated polyester of an ethylenically unsaturated dicarboxylic acid and a dihydric alcohol and (B) an ethylenically unsaturated compound copolymerizable with the polyester, the mixture being stabilized with a small stabilizing amount of a dissolved quaternary ammonium salt of a non-oxidizing acid which is at least as strong as acetic acid.

23. The composition of claim 22 wherein the salt is a halide.

24. The composition of claim 22 wherein the salt is a halide and the ethylenically unsaturated compound is styrene.

25. The composition of claim 22 wherein the unsaturated dicarboxylic acid is maleic acid.

26. A composition of matter comprising a copolymerizable mixture of (A) a polymerizable polyester of maleic acid and a dihydric alcohol and (B) styrene, the mixture being stabilized with a small stabilizing amount of a dissolved quaternary ammonium halide.

EARL E. PARKER.

REFERENCES CITED

The following references are of record in the file of this patent:

UNITED STATES PATENTS

| Number | Name | Date |
|---|---|---|
| 2,255,313 | Ellis | Sept. 9, 1941 |
| 2,351,658 | Berne-Allen | June 20, 1944 |
| 2,351,664 | Cockerille | June 20, 1944 |
| 2,361,538 | Franz | Oct. 31, 1944 |
| 2,453,666 | Kropa | Nov. 9, 1948 |

FOREIGN PATENTS

| Number | Country | Date |
|---|---|---|
| 540,167 | Great Britain | Oct. 8, 1941 |